Apr. 3, 1923

E. W. DAVIS

MOTION PICTURE CAMERA

Filed May 24, 1919

Witnesses:
Harry R. LeWhite
W. F. Kilroy

Inventor:
Ernest W. Davis.
By Rudolph — Atty.

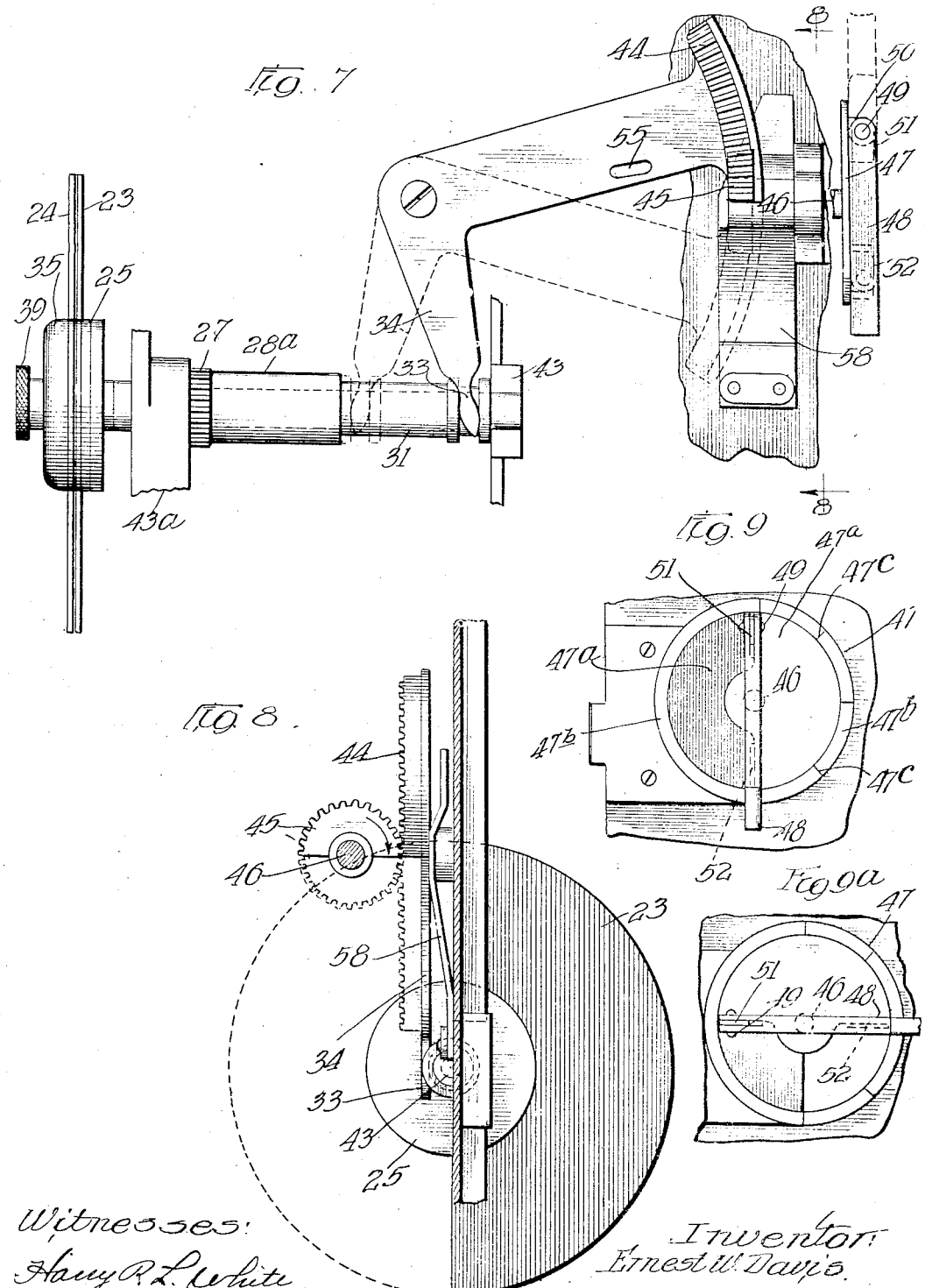

Apr. 3, 1923
E. W. DAVIS
MOTION PICTURE CAMERA
Filed May 24, 1919
1,450,433
5 sheets-sheet 5
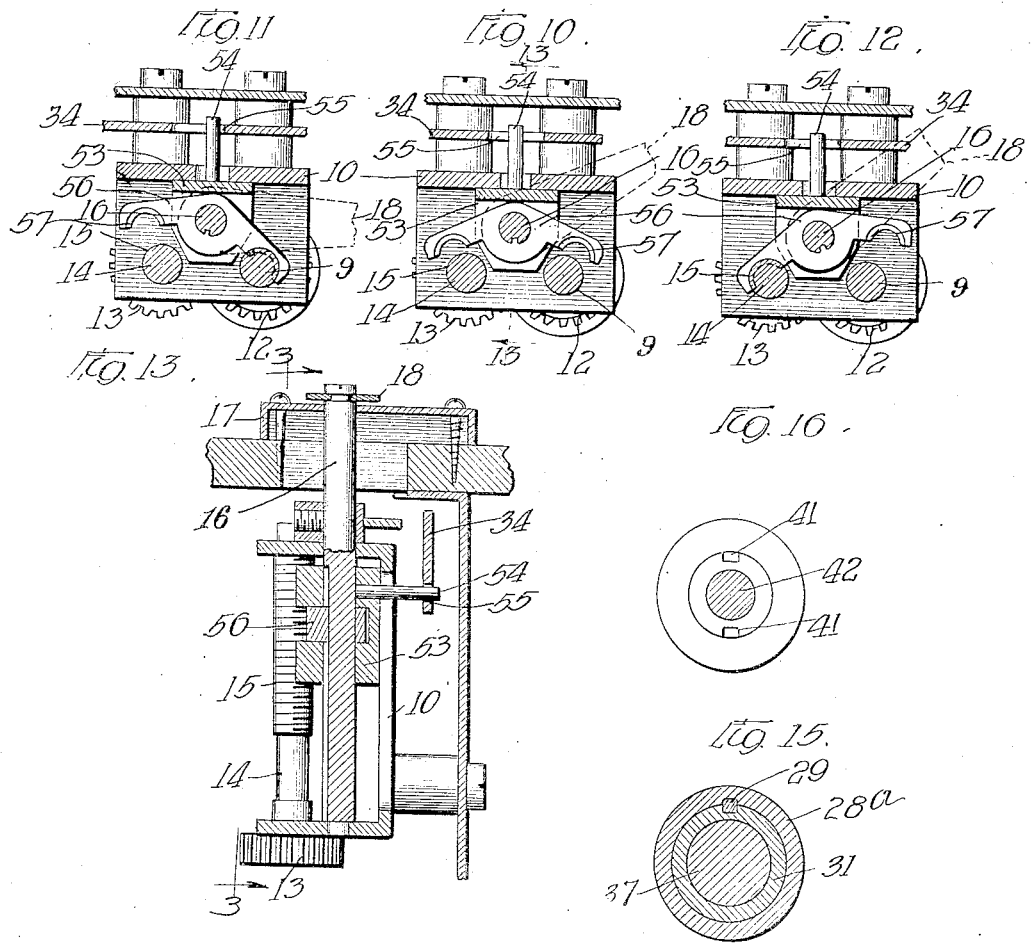
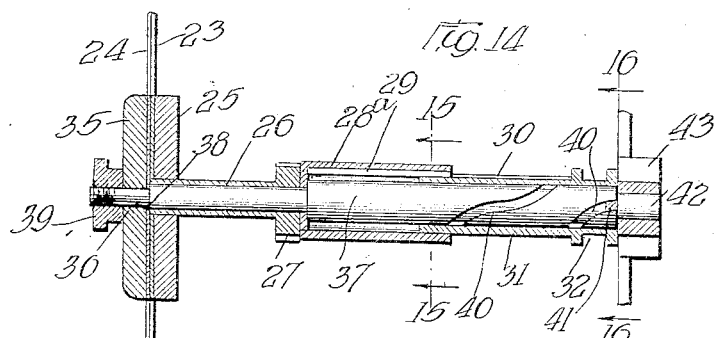
Witnesses
Harry R. White
W. P. Kilroy
Inventor
Ernest W. Davis
By Rudolph ... Atty.

Patented Apr. 3, 1923.

1,450,433

UNITED STATES PATENT OFFICE.

ERNEST W. DAVIS, OF CHICAGO, ILLINOIS, ASSIGNOR TO BURKE & JAMES, INC., OF CHICAGO, ILLINOIS, A CORPORATION OF DELAWARE.

MOTION-PICTURE CAMERA.

Application filed May 24, 1919. Serial No. 299,528.

*To all whom it may concern:*

Be it known that I, ERNEST W. DAVIS, a citizen of the United States, residing at Chicago, in the county of Cook and State of Illinois, have invented certain new and useful Improvements in Motion-Picture Cameras; and I do hereby declare the following to be a full, clear, and exact description of the invention, such as will enable others skilled in the art to which it appertains to make and use the same.

This invention relates to improvements in motion picture cameras and has for its particular object to provide means for manually adjusting the shutter opening during operation of the camera and providing means for exteriorly indicating the size of the shutter opening and further in providing means for producing so-called dissolving effects during the photographing of objects in motion whereby the picture becomes gradually dimmed and finally disappears from view or, vice versa, appears first vaguely and gradually more clearly and wherein the last named means are associated with the first named for similarly indicating the size of the shutter opening exteriorly of the camera housing to prevent waste of film by operation of the camera after the shutter is closed.

The invention relates, therefore, more particularly to means for manually effecting closing or opening of the shutter of the camera in whole or in part while operating the same and providing means associated directly and intimately with the operating means for enabling the operator to see the exact extent of the shutter opening at all times.

The invention consists in the features of construction and combinations of parts hereinafter fully described and particularly claimed.

In the accompanying drawings illustrating the preferred embodiment of the invention:

Figure 7 is a fragmentary detail view in elevation showing a part of the mechanism for manually actuating the shutter.

Figure 8 is a detail vertical section on the line 8—8 of Figure 7.

Figures 9 and 9ª are fragmentary detail rear end elevations showing the shutter indicator and hand lever for controlling the operation of the shutter and showing the said parts in closed and partially open positions, respectively.

Figure 3:
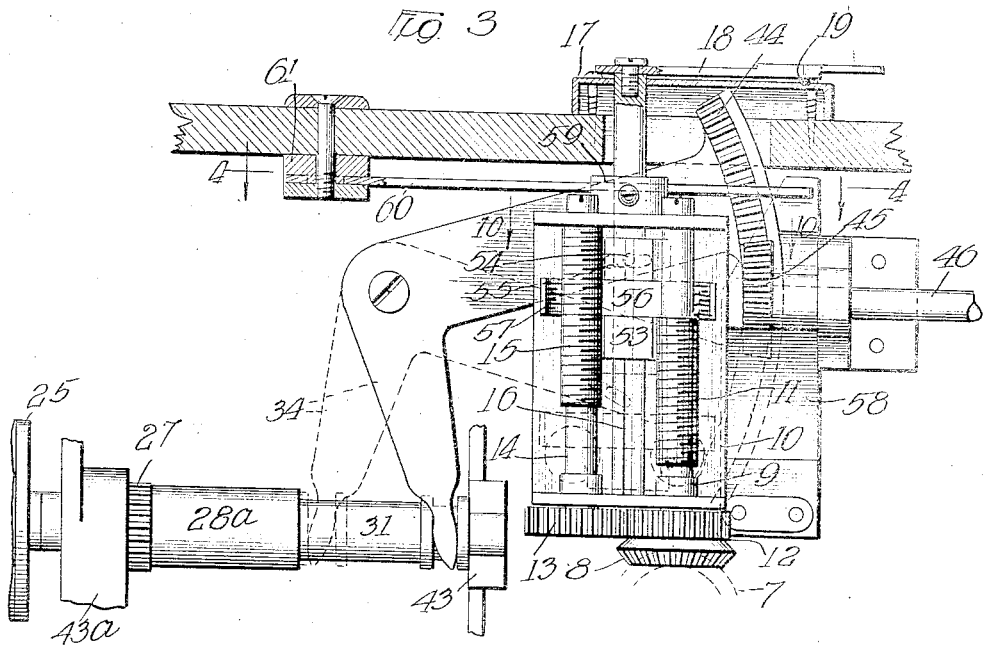
Figure 3 is a fragmentary detail vertical section on the line 3—3 of Figure 13.
Figure 4:
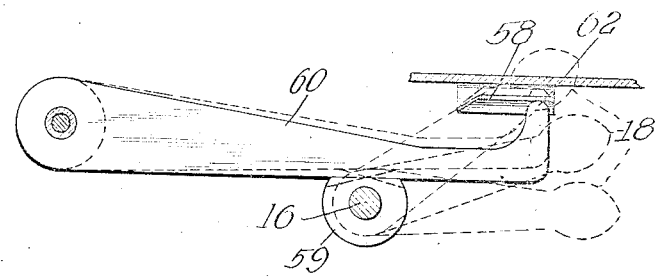
Figure 4 is a fragmentary detail plan section on the line 4—4 of Figure 3.

Figures 10, 11, and 12 are fragmentary detail plan sections on the line 10—10 of Figure 3 showing a part of the operating mechanism in different positions.

Figure 13 is a fragmentary detail vertical section on the line 13—13 of Figure 10.

Figure 1:
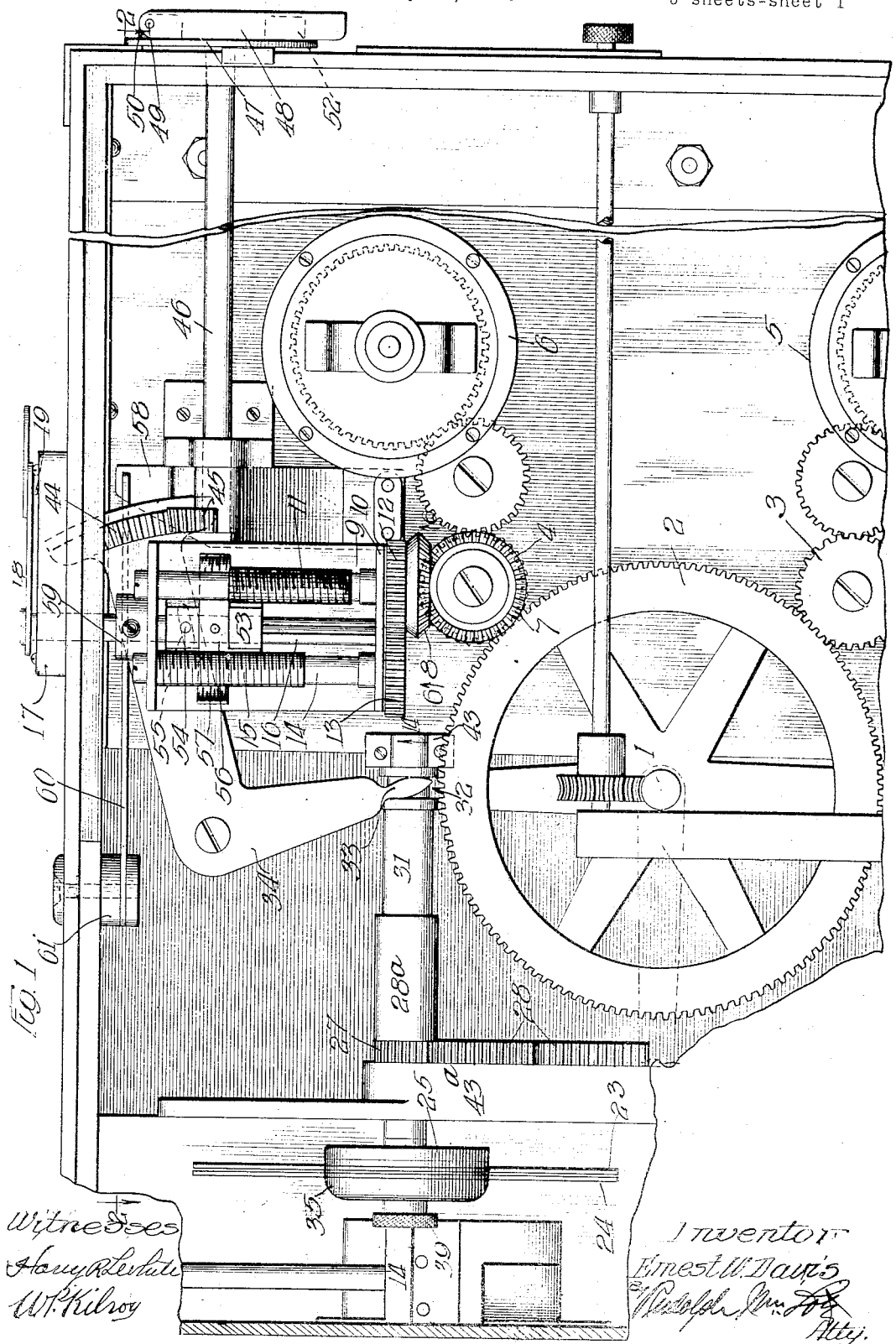
Figure 1 is a fragmentary view in side elevation of a camera equipped with shutter actuating means constructed in accordance with the invention, the side plate of the camera being removed to expose the mechanism to view.

Figure 14 is a fragmentary detail vertical section on the line 14—14 of Figure 1.

Figures 15 and 16 are detail sections respectively on the lines 15—15 and 16—16 of Figure 14.

In said drawings, the drive shaft 1 of the camera is shown as carrying the actuating spur gear wheel 2 which meshes with spur pinions 3 and 4 respectively constituting a part of the gear train associated with the spool-carrying elements 5 and 6 for actuating the latter to cause the photographic film to be unwound from the one thereof and wound upon the other after it has traveled through the exposure plane of the camera in the usual and well-known manner. Illustration of the film and its path of travel is omitted as constituting no part of the present invention.

Rigid with the spur pinion 4 is a bevel pinion or gear 7 which meshes with a similar gear 8 mounted at the lower end of a vertical shaft 9. The shaft 9 is journaled in bearings in flanges of a U-shaped supporting frame or bracket 10 suitably supported within the camera housing. Said shaft carries a worm 11 having preferably right-hand threads. Rigid on the shaft 9 is a spur gear 12 which meshes with a similar gear 13 on the lower end of a companion vertical shaft 14 also journaled in bearings in the said frame 10 and which carries a worm 15 having a similar right-hand thread.

Figure 5:
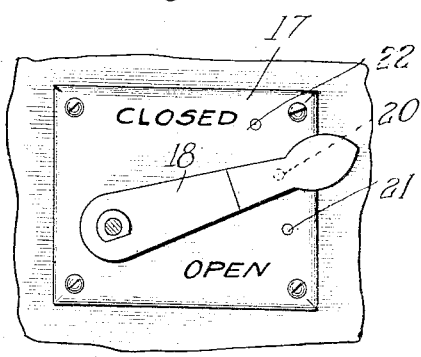
Figure 5 is a fragmentary top plan view showing an external controlling lever.
Figure 6:
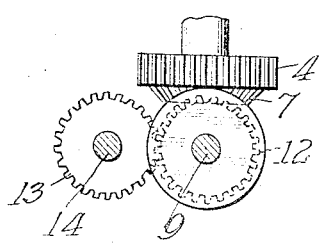
Figure 6 is a fragmentary detail plan section on the line 6—6 of Figure 1.

Parallel with and disposed rearwardly of and substantially midway between the shafts 9 and 14 is a vertical rock-shaft 16 having a keyway therein. The said shaft 16 is journaled at its lower end in a bearing in a flange of the frame or bracket 10 and at its upper end projects through the top wall of the housing and through a small box or casing 17 mounted thereon which is more particularly shown in Figure 3. Secured to the upper end of said rock-shaft 16 is a lever 18 which, as shown in Figure 5, is of an elastic nature and carries a small projection 19 adapted to engage in one of the three openings 20, 21 and 22 in the top wall of the casing 17. The opening 22 is indicated by the word "Closed" and the other opening 21 by the word "Open" indicating that when the projection 19 is engaged with the opening 22, the shutter mechanism of the camera will be moved from open to closed position and when it is engaged with the opening 21, it will be moved from closed to open position as will hereinafter more fully appear.

The camera is provided with the usual rotatable shutter comprising two relatively movable elements, one of which, indicated at 24, is adapted to become positioned relatively to the part 23 to present a segmental opening of varying arcuate lengths. Each of the disks or elements 23 and 24 is substantially semi-circular so that when in one position they will present a substantially semi-circular opening for penetration of light rays from the lens to the exposure plane during one-half of each revolution of the shutter, but when positioned otherwise, will present less open space, thereby decreasing the normal duration of exposure of each of the views to be photographed in a well-known manner.

The disk 23 is rigid with a companion disk 25 nonrotatably mounted upon the hollow shaft 26 as shown in Figure 14. The shaft 26 carries a spur gear 27 constituting a part of the gear train 28 which is actuated from the shaft 1 by means not specifically shown herein as constituting no part of the present invention. The shaft 26 is also rigid with a sleeve 28ª which is provided with a longitudinal rib or key 29. The latter engages in a keyway 30 in a sleeve 31 provided at its rear end with an annular groove 32 in which the forked end 33 of a bell crank lever 34 engages.

The disk 24 is rigid with a companion disk 35 rigidly mounted upon a shaft 36 passing through the hollow shaft 26 and having an enlarged end portion 37 passing through the sleeve 28ª and the sleeve 31.

The forward end of the shaft 36 is slightly annularly reduced in size so that the middle of the disk 24 abuts against an annular shoulder 38 against which it is clamped by means of the nut 39 in an obvious manner. The enlarged portion 37 of the shaft 36 is provided at its rear end with two helical grooves 40 which are diametrically opposed and each of which receives a projection 41 extending inwardly from diametrically opposite sides of the sleeve 31 at the rear end of the latter. Accordingly, it will be noted that as the sleeve 31 moves toward the disks 23 and 24, the shaft 37 will be rotated relatively to the hollow shaft 26 thereby effecting an adjustment of the exposure opening of the shutter. The shaft 36 has a reduced rear end portion 42 journaled in a bearing 43 mounted on a suitable part of the camera housing. The sleeve 26 is journaled in a bearing in a member 43ª of the frame upon which the gear train 28 is suitably mounted.

The bell-crank lever 34 terminates at its other end in a segmental rack 44 which meshes with the semi-circular gear 45 rigidly mounted upon the inner end of a rock shaft 46 which is engaged at its outer end with a substantially semi-circular disk 47 upon the rear wall of the housing. Said disk 47 is manually rotatable by means of the lever 48 pivotally mounted thereon for effecting manual adjustment of the exposure opening of the shutter to suit the requirements of the light at the time the camera is to be operated to take pictures. It will be noted that the pivot pin 49 of the lever 48 is eccentric to the rear end of said lever and that the latter presents a cutaway portion 50 contiguous to said pivot opening. Mounted on the said disk are two projections 51 and 52 which are received between the flanges of the said lever 48, which is U-shaped in cross-section, for preventing flexion of said lever when digitally engaged to rotate said disk. The lever may be thrown to the position indicated in the dotted lines in Figure 7 to increase the operator's leverage for rotating the shaft 46 to effect primary adjustment of the shutter as will be obvious. The two parts of the outer surfaces of the disk are distinguished in color as indicated in Figure 9 whereby to indicate to the operator the extent of the arcuate exposure opening of the shutter.

The disk 47 is rotatable within a circular field 47ª bordered by a ring 47ᵇ. One-half of this field is of a dark color and the other half is white or of a color contrasting with the first named half. When the disk 47 is in the position shown in Figure 9 the last named or white half is completely hidden from view thus indicating that the shutter is completely closed. By turning the disk 47 anti-clockwise the white portion of the field will be exposed to view as shown in Figure 9ª to the extent of a segment corresponding in arcuate extent with the shutter opening. The indicating marks 47ᶜ on the ring are provided to indicate any desired fractions of the full opening of the shutter but are not usually used by experienced operators who rely on judgment for proper degrees of openings to suit the conditions of the light and other elements entering into successful photography.

The lever 48 and the shaft 46 are operable to adjust the shutter only in the event that the lever 19 is disposed in the position shown in Figure 5 as will appear from the following:

The shaft 16 (as shown in Figure 13) passes through a carriage 53 which carries a pin 54 engaging in a slot 55 in the lever 34. Said carriage 53 is U-shaped and in the recess therein there is mounted a rocking element or clutch 56 which is provided at its opposite ends with concave substantially semi-circular recesses 57 each of which is threaded to engage the threads of the respective worms 11 and 15.

The element 56 (which for convenience I shall term a clutch) is keyed on the shaft 16 so that when either end thereof is engaged with one of the worms 11 or 15, said clutch 56 and the carriage 53 will be moved up or down depending upon which of said worms happens to be engaged. By reference to Figure 5, it will be noted that when the lever 18 is in the position there shown, the clutch 56 will be in the position shown in Figure 10. If the clutch is engaged with the worm 11, the projection 19 will be engaged with the opening 21 and thereupon, the carriage 53 will be caused to move downwardly and if the projection 19 is engaged with the opening 22, the clutch 56 will be in the position shown in Figure 12 thereby causing the carriage 53 to move upwardly. The lever 34 will thus be swung in one instance to cause the exposure opening in the shutter to gradually close and in the latter instance to gradually open, as will be obvious.

When the clutch 56 is in the position shown in Figure 10, (which I will for convenience term "neutral position") the exposure opening of the shutter may be manually adjusted as hereinbefore described, but when said clutch 56 is in the position shown in Figures 11 or 12 respectively, it will serve to lock the lever 34 against movement by the gear on the shaft 46, and will thus prevent manual adjustment of the shutter opening.

In order that the clutch 56 and carriage 53 may be readily operated and further to insure proper manual operation thereof, I provide a spring 58 which is disposed rearwardly of the segmental rack of the lever 34 as more particularly shown in Figures 7 and 8. Said spring normally bears upon the rear face of the rack to hold the same very firmly in mesh with the gear 45 not only to prevent lost motion but also to resist free movement of said parts, acting more or less as a brake to prevent movement of said parts under the influence of shock or vibration but when the automatic adjustment of the shutter is being effected through the mediacy of the clutch 56, it is desirable that the lever 34 should operate very freely, and to this end should be relieved of the pressure of said spring 58. Hence, I provide on the shaft 16, above the bracket 10, a cam element 59 consisting of a circular disk having a flat surface which normally bears upon one edge of the lever 60 pivotally mounted at one end on a suitable supporting element 61 of the machine frame and which at its free end is provided with a projection 62 bearing upon the upper end of the spring 58. When the lever 18 is in the position shown in Figure 5 (which is its neutral position) the projection 62 of the lever 60 permits the spring 58 to bear with full force upon the rear face of the rack 44, but when the projection 19 is engaged with either of the openings 21 and 22, the said lever 60 will be moved to force the spring 58 away from the rear face of the rack 44, thus reducing frictional resistance to the operation of the lever 34.

It will also be noted that the respective worms 11 and 15 are offset relatively to each other so that the travel of the clutch 56 and carriage 53 will be limited in either direction to prevent turning the lever 34 through an arc greater than that required to entirely close or entirely open the shutter.

While the operation of the camera will be very readily understood from the foregoing description, a brief résumé of said operation is appended.

Figure 2:
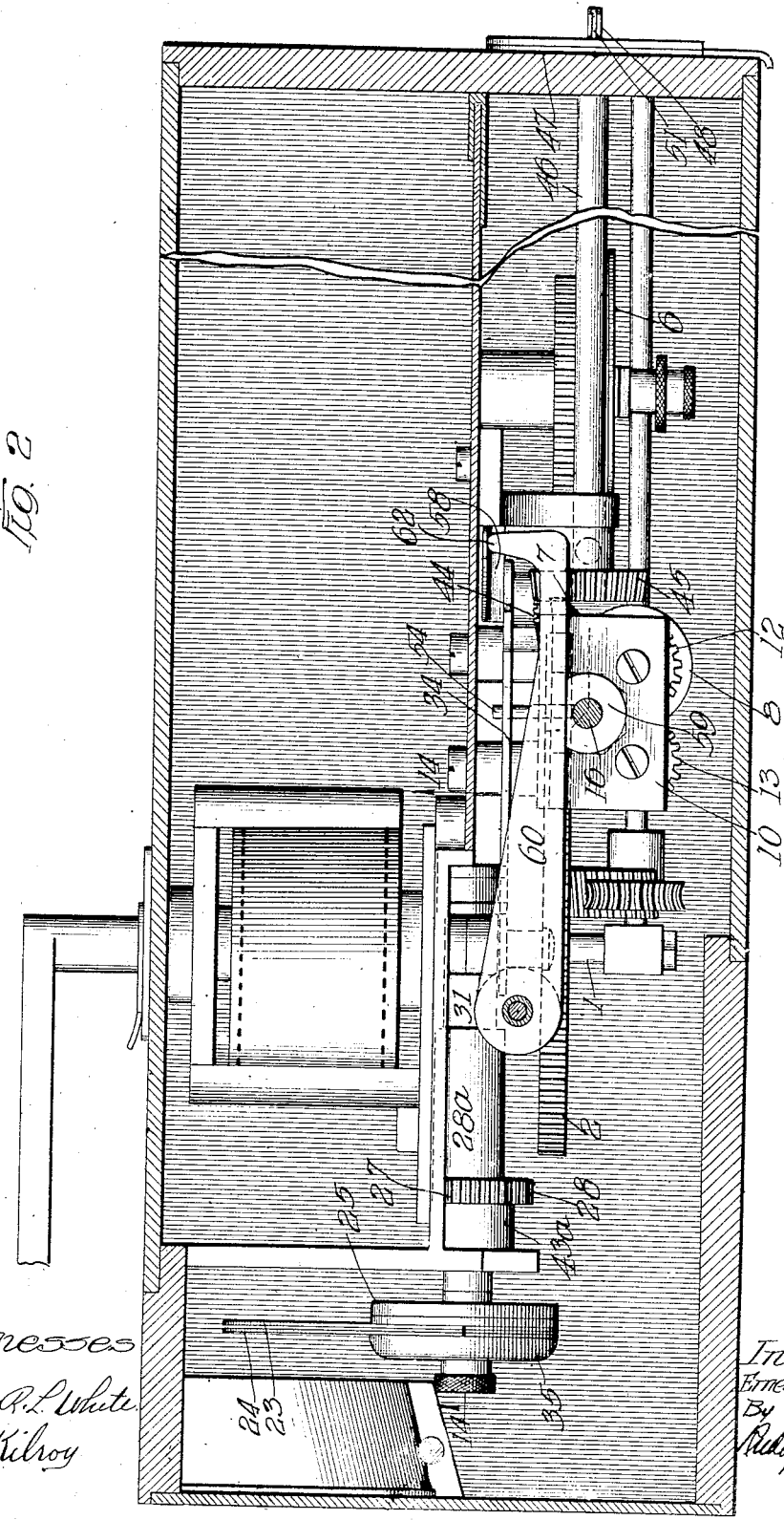
Figure 2 is a plan section on the line 2—2 of Figure 1.

Ordinarily, the operator will maintain the lever 18 in the neutral position shown in Figure 5, thus maintaining the clutch 56 out of engagement with either of the worms 11 or 15. Then by means of the shaft 46 and lever 48, the operator adjusts the shutter opening to suit the light in the usual manner. The pictures are then taken in the customary manner and if at the end of a certain series, as for example at the termination of a scene or "reel" as it is called, it is desired to let the object to be photographed gradually disappear from view, the operator while turning the shaft 1, by means of the crank shown in Figure 2, will move the projection 19 to engage with the opening 22 whereupon the shutter will gradually close thus causing the image photographed on the film to become gradually more dim until it entirely disappears. Similarly, if at the opening of a scene or the beginning of a reel, the operator desires the object to be photographed to come gradually into view, he moves the lever 18 so that the projection 19 engages with the opening 21 thus causing the shutter to move gradually from closed to open position. During the photographing, the lever 18 may be moved to neutral position whenever in the judgment of the operator the shutter opening has attained that extent best adapted to the light which is obviously easily within the powers of the experienced operator. If the operator does not move the lever 18 to neutral position while the opening or closing of the shutter is being effected automatically as aforesaid, then the opening or closing movement will be continued until the clutch 56 passes automatically out of engagement with the worm with which it is at that time engaged in the manner obvious from the drawings.

I am aware that means heretofore have been devised and used for automatically adjusting the shutter opening of motion picture cameras and indicating on the exterior of the housing the extent of such opening. The present improvement differs from the prior art as far as the same is known to me in that the means for indicating the extent of the shutter opening is more directly and intimately associated with the operation mechanism so that the operator is not required to actuate an element on one part of the housing while keeping his eye on another part. As the operator is usually kept extremely busy while working the camera it is desirable to provide means of the character aforesaid which can be very quickly actuated to accurately adjust the shutter opening and which will simultaneously indicate the size of the same. It is also important that the manually operable adjusting means shall be so resisted as not to operate under the influence of shock or vibration and which will be automatically rendered easily operable or movable by means of the automatic mechanism hereinbefore described.

It will be noted that the indicator shown in Figures 9 and 9ª is substantially a reproduction of the shutter in which the rigid disk is the counterpart of the body of the shutter rigid with the shaft carrying the same and the movable disk is the counterpart of the movable leaf of the shutter. By means of the mechanism operatively connecting the latter with the movable leaf of the shutter these elements are caused to move in unison to the extent that both affect the arcuate extent of an exposure opening.

While I have shown preferred embodiment of the invention in the accompanying drawing, it will be understood, of course, that such embodiment may be changed and varied in details without departing from the invention as defined in the appended claims.

I claim as my invention:

1. In a motion picture camera, the combination with a shutter having an adjustable exposure opening, of mechanism associated with the said shutter and the operating mechanism of the camera for automatically gradually opening or closing the exposure opening of the shutter while operating the camera, means manually operable independently of said automatic means for adjusting said exposure opening, manually operable means controlling the aforesaid automatic mechanism to throw the same into or out of operation, and means associated with said controlling means and said manually operable adjusting means for rendering the latter inoperative when the automatic means are thrown in and vice versa.

2. In a motion picture camera, the combination with a shutter having an adjustable exposure opening, of mechanism associated with the said shutter and the operating mechanism of the camera for automatically gradually opening or closing the exposure opening of the shutter while operating the camera, a shutter opening indicator disposed exteriorly of the camera housing and operatively associated with the shutter and said operating mechanism to indicate the extent of opening of the shutter at all times, manually operable means associated with said shutter and said indicator for manually adjusting the shutter opening and a manually operable control lever associated with the said last-named means and said automatic means for throwing the latter into and out of action and simultaneously therewith affecting the operative connection between the shutter and said manually operable means to obviate lost motion and prevent accidental variation in size of the shutter opening.

3. In a motion picture camera, the combination with a shutter having an adjustable exposure opening, manually operable means for adjusting the shutter opening, and mechanism for actuating the shutter to admit light at intervals to the exposure plane, of means associated with said manually operable adjusting means and with the actuating mechanism for automatically gradually opening or closing the shutter opening during operation of the camera, a manually operable control lever for throwing the automatic mechanism into or out of operative relation to the shutter, means controlled by said lever for affecting the association between said automatic and said manually operable means to obviate lost motion between the latter and the shutter and frictionally resist accidental movement of said manually operable mechanism at the same time that said lever throws the automatic mechanism out of action.

4. In a motion picture camera, the combination with a shutter having an adjustable exposure opening, means manually operable from the exterior of the camera housing for adjusting the size of said exposure opening, mechanism associated with the manually operable means and with the film feeding mechanism for automatically varying the exposure opening while operating the camera, a manually operable control lever for throwing said automatic mechanism into or out of action, a flexible element included in the connection between the manually and automatic operating mechanism and operatively associated with the control lever for rendering said mechanisms freely movable when the automatic mechanism is operative and for effecting frictional resistance to the operation of the manual mechanism when the automatic mechanism is out of action.

5. In a motion picture camera, the combination with a shutter having an adjustable exposure opening, means manually operable from the exterior of the camera housing for adjusting the size of said exposure opening, mechanism associated with the manually operable means and with the film feeding mechanism for automatically varying the exposure opening while operating the camera, a manually operable control lever for throwing said automatic mechanism into or out of action, a flexible element included in the connection between the manual and automatic operating mechanisms and operatively associated with the control lever for rendering said mechanisms freely movable when the automatic mechanism is operative and for effecting frictional resistance to the operation of the manual mechanism when the automatic mechanism is out of action, and a shutter opening indicator on the exterior of the housing associated with the said mechanisms for indicating the extent of opening of the shutter.

ERNEST W. DAVIS.